July 4, 1950 R. A. BOCCIA 2,514,119
BREAKWATER
Filed May 11, 1946 2 Sheets-Sheet 1

INVENTOR.
Raymond A. Boccia,
BY Hull & West
ATTORNEYS

July 4, 1950 — R. A. BOCCIA — 2,514,119
BREAKWATER
Filed May 11, 1946 — 2 Sheets-Sheet 2

INVENTOR.
Raymond A. Boccia
BY Hull & West
ATTORNEYS

Patented July 4, 1950

2,514,119

UNITED STATES PATENT OFFICE 2,514,119

BREAKWATER

Raymond A. Boccia, Cleveland, Ohio

Application May 11, 1946, Serial No. 669,001

13 Claims. (Cl. 61—4)

This invention relates to breakwaters or jetties and has for its general object to provide a construction the parts of which can be fabricated and subsequently assembled in units upon a portion of a beach, or upon the bottom of a body of water for the purpose of protecting the water intervening between the breakwater or jetty and the shore from the violence of waves, or which can be utilized for the prevention of erosion of beaches by the impact of waves thereupon.

Fundamentally, my invention consists of a wall composed of a plurality of units, each consisting in turn of vertically spaced bars, in lattice-like formation, supported by vertical posts. This wall is preferably connected to a rear wall, also composed of a plurality of units, which units are connected by transverse posts or beams with the units of the front wall. The rear wall, in one embodiment of my invention, consists of units which are similar in construction to the front wall; it consists, in the other embodiment of my invention, of units in the shape of sheet piling. The former form of my breakwater or jetty is useful in preventing the destructive waves which are produced in a large body of water located offshore from my breakwater or jetty from exercising a destructive effect upon objects such as vessels or small craft which may be anchored or moored inshore from the breakwater or jetty. The second form of my invention is particularly useful in preventing the erosion of beaches by the action of waves.

Figure 2:
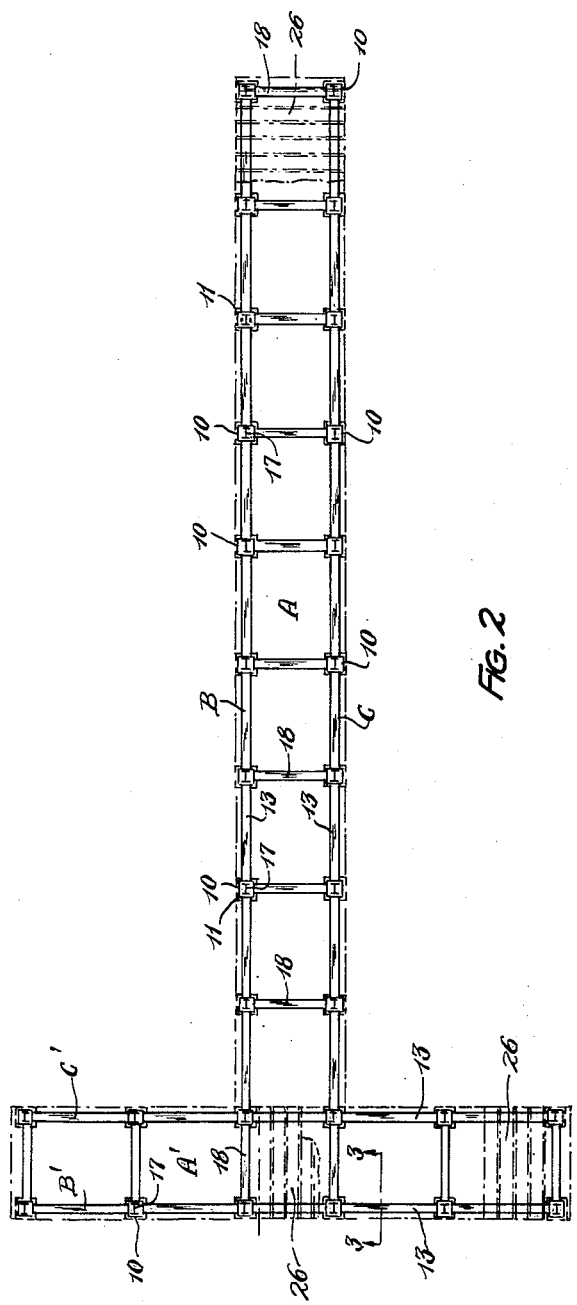
Figure 1:
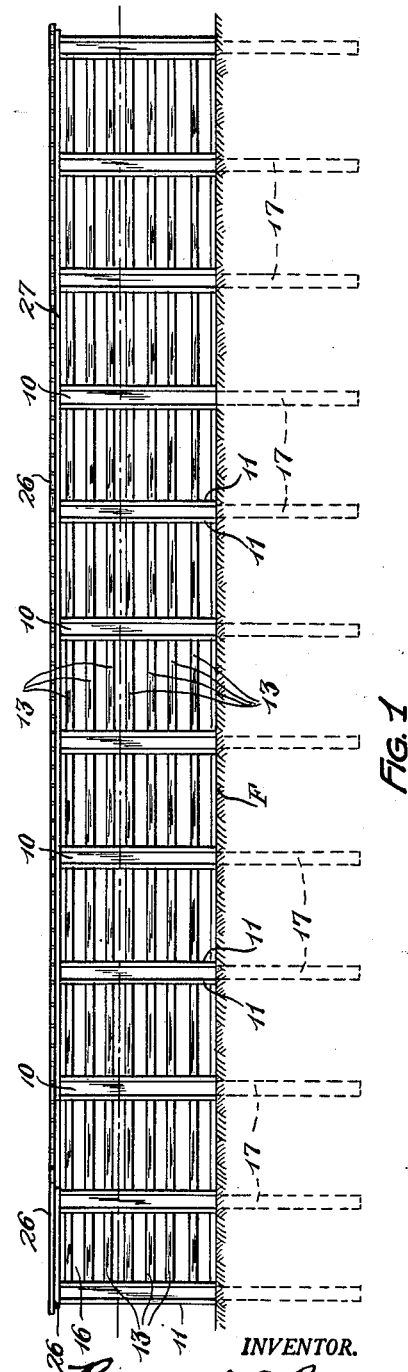
Figure 6:
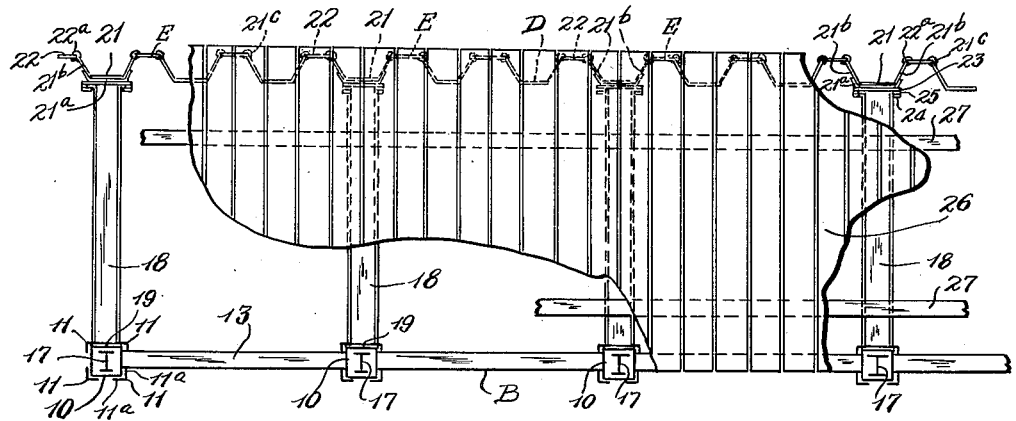
Figure 4:
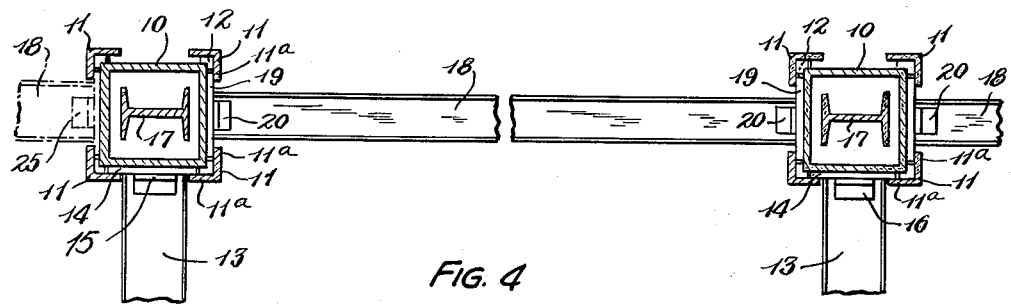
Figure 3:
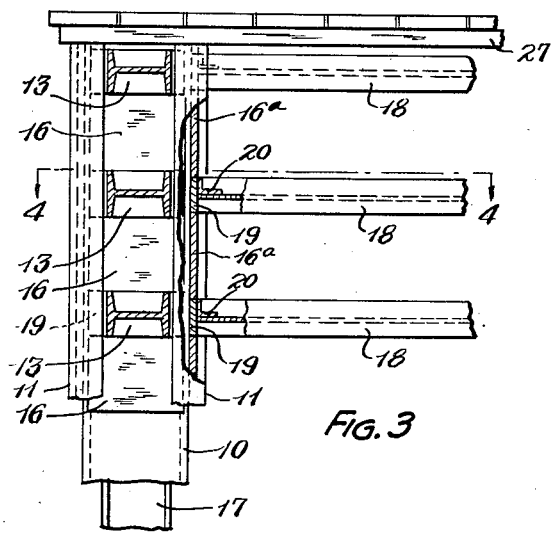
Figure 5:
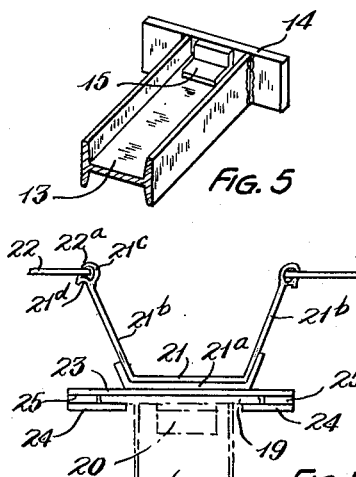

In the drawings hereof, Fig. 1 is a side elevational view of a section of a breakwater constructed in accordance with and embodying the first form of my invention; Fig. 2 a plan view of the breakwater shown in the preceding view, the same being combined with a breakwater connected to and extending across one of its ends; Fig. 3 an enlarged detail in section taken on the line 3—3 of Fig. 2 and looking in the direction of the arrows; Fig. 4 a detail in horizontal section taken on the line 4—4 of Fig. 3, extended to include an adjacent post; Fig. 5 a detail in perspective of one of the transverse bracing beams; Fig. 6 a plan view, with parts broken away, of a portion of a breakwater embodying a modification of the form shown in Figs. 1 and 2; and Fig. 7 a detail in section of the inner wall, showing the manner in which the units of said wall are connected and are supported from their anchoring means.

Describing the various parts by reference characters, and first with reference to Figs. 1–5, A represents so much of a breakwater and A' so much of a cooperating breakwater extending transversely and which will serve to illustrate one application of my invention.

More specifically, B denotes the outer wall and C the inner wall of the breakwater A, and B' the outer wall and C' the inner wall of the breakwater A'. The structures of the parts of the breakwaters A and A' are identical, and a description of the parts of one of the same will suffice for both.

In the embodiment of my invention shown in Figs. 1 to 6, the outer walls B and C and B' and C' are identical in construction, hence a description of the manner in which one of these walls is constructed will suffice for a description of the other. Each of the walls comprises a plurality of units each of which units may be considered as consisting of a plurality of vertically spaced horizontally extending beams removably supported at their opposite ends by and between posts anchored to the bottom of the body of water in which the wall is to be located, with removable spacers interposed between the ends of the beams whereby they provide a lattice-work effect against waves encountering the wall.

The anchoring means referred to comprises outer posts, preferably square in section and provided with means for slidably engaging the ends of the beams interposed therebetween, as well as slidably engaging the spacers between said ends, with anchoring posts located within the hollow posts and driven to a suitable depth beneath the water to support the hollow posts and the beams interposed between the latter.

10 denotes the hollow posts generally, the same being shown as square in section and having angle members 11 secured to the corners thereof, with their flanges spaced from the walls of the posts which the said flanges overlap. The spacing and supporting means for the angle members are indicated at 12 and are united to the angle members and to the corners of the posts, as by welding. It will be seen that these flanges provide, with the walls of the posts 10 which they overlap, vertical guideways extending downwardly along the side walls of said posts substantially to the bottoms of the unsubmerged portions of the latter.

13 denotes a plurality of beams, shown as I-beams having rectangular end plates 14 secured thereto by means of angle members 15 which in turn are secured to the webs of the beams 13 and to the said plates, as by welding, and these plates are adapted to be received within the guideways formed by the flanges 11ᵃ of the angle members 11 which overhang the opposed walls of adjacent posts 10. In practice, the end plates 14 of a beam 13 are inserted between the appropriate flanges on opposed adjacent posts and the beam is slid downwardly to the bottoms of the unsubmerged portions of said posts, or to points adjacent to the bottoms of said unsubmerged portions, the posts being provided with stops adjacent the bottoms thereof to limit the downward movement of the said beam. Spacing plates 16 are then inserted between the guides provided for the ends of the beam 13 that has just been positioned and are slid downwardly until they engage the plates 14 on said beam. Thereafter, another beam is positioned in the same manner as the first beam, and successive beams and successive spacing plates are inserted until the top of the outer wall is reached. This operation will be repeated in respect to all of the posts 10 that may be employed in the construction of the outer wall.

The posts 10 are not depended upon for the entire support of the latticed wall, the depth to which their lower ends may enter the bottom F being determined by the the hardness or softness of the bottom and the weight of the outer wall. In order to anchor this wall in position, I employ posts 17 shown as H-beams, which are driven downwardly within the posts 10 to an extent necessary to secure a firm support for the wall.

In Figs. 1 and 2, the inner wall C of the breakwater is identical in construction with the outer wall, and the corresponding parts are identified by the same numerals. These walls are connected by means of beams 18, which may be similar to the beams 13 and each of which has end plates 19 secured thereto, as by means of angle blocks 20 secured to the web thereof and to the said plates. These beams 18 are inserted within the guideways provided therefor on opposed front and rear posts and are arranged therein and spaced apart in the same manner as is the case with the beams 13, the spacing plates between successive beams being the same as those employed in connection with the beams 13 and being identified by the same reference character.

Figure 7:
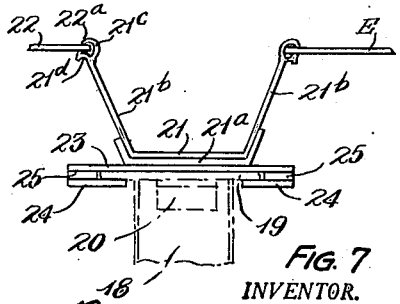

In Figs. 6 and 7 there is shown an embodiment of my invention wherein the outer wall B is constructed in the same manner as the outer and inner walls of the preceding embodiment and the parts whereof are designated by the same reference characters which are applied to the corresponding parts in such preceding embodiment. The inner wall, in this second embodiment of my invention, consists of sheet piling which is connected to the outer wall in a manner to be described, the combination of the outer and inner walls being designed more particularly for the prevention of erosion of beaches.

In Figs. 6 and 7, D and E denote generally sheet-piling sections, the sections D being generally of U-shape, comprising a flat base 21 to which there is secured, as by welding, a reinforcing plate 21a which extends across the exterior of said base and along the exteriors of the outwardly diverging sides 21b and being secured to the said sides, as by welding. The outer ends of the sides 21b are formed into slotted guideway sleeves preferably extending continuously the full lengths thereof and comprised between hook-shaped walls 21c and curved cooperating walls 21d, the ends of the said walls being spaced apart to provide slots of sufficient width to receive therewithin the thin metal bodies 22 of the adjacent sections E, said adjacent sections being each provided at each end thereof with a projection 22a extending continuously the full length thereof and each conforming generally to the shape of the interior of the sleeves formed by the walls 21c and 21d. The sections can be obviously assembled by inserting the lower ends of the projections 22a within the sleeves at the outer ends of the walls 21b of the sections D adjacent thereto, with the bodies 22 adjacent to said projections extending through the slots between the walls of said sleeves.

In order to anchor an inner wall, formed by assembling in interlocking relation the necessary number of sections D and E, I provide transversely extending beams 18, which are preferably identical in construction with the like-identified beams in the preceding embodiment of my invention, the plates 19 at the ends of said beams being adapted to be received within the guides provided therefor by the flanges 11a overhanging the inner walls of the outer posts 10 and the like-designated plates on the opposite ends of the said beams being received within vertical guides, similar to those provided for the posts 10, and shown as produced by welding to the exteriors of the reinforcing plates 21a vertically extending plates 23, constituting posts and each having guideways for the plates 19 provided by narrow plates 24, united to the plates 23 in overhanging relation thereto by means of spacers 25.

The outer wall will be anchored by inner posts 17 in the same manner as is the case with the outer and inner walls of the preceding embodiment of my invention. Because of the environment in which the second embodiment of my invention is to be used, it will be unnecessary to provide the inner wall with any special anchoring means, sufficient anchorage being obtained by driving the sheet metal piling into the earth to the desired depth. Furthermore, it will probably be unnecessary to use as many transverse bracing beams 18 as is the case where the inner wall is constructed in the same manner as the outer wall and wherein the breakwater is to be subjected to severer action of waves.

In both forms of my invention, the height of the inner and outer walls will vary with the depth of the water in which the respective breakwaters are to be installed, the brakewaters extending higher above the normal surface of the water in installations wherein they are liable to be subjected to waves of considerable height and violence than is the case with installations wherein they are liable to be subjected to waves of less height and violence. In practice, where my breakwaters are to be used in the same manner as an ordinary breakwater, the walls will project from three to four feet above the ordinary level of the water. When used for the construction of a dock, the walls may extend as high as from eight to ten feet above the level of the water.

In operation, waves striking the outer wall will be broken up by the lattice-work arrangement of the beams 13 into streams, and these streams will be broken up further into smaller streams by the beams of the inner wall, with the result that the space inshore of the breakwater or in the lee of a dock formed from my breakwater, will be amply protected against damage and with a minimizing effect of the backwash upon the bottom. Furthermore, the lattice-work construction provided by the beams 18 will cooperate in breaking up the waves between the outer and inner walls and will be particularly useful where the waves are striking the outer wall at an angle other than a right angle.

The breakwater constructed in accordance with the form of my invention shown in Figs. 6 and 7 is especially adapted for the prevention of erosion of beaches, the outer wall serving to break up into streams the comparatively low waves which are created in the shallow waters wherein this breakwater is installed, thereby protecting the sheet-piling inner wall from destruction and enabling it to prevent the portion of the beach in which it is embedded from being swept out by the backwash.

The breakwater construction shown in both forms of my invention may be provided with a deck, indicated generally at 26, supported above and upon the topmost beams 18 by supporting members 27 extending transversely of said beams and adjacent to the outer ends thereof.

While a breakwater consisting only of either of the walls B and C will be advantageous and, in some locations, render the use of an inner wall unnecessary, the combination of the two walls with the means connecting the same into a complete assembly will enable the same to be used in locations varying widely in respect to the height and the violence of the waves to be subdued.

While the breakwaters shown in the drawings hereof are straight, it will be obvious that they may be given a generally curvilinear shape, as by shortening the beams 13 of either of the walls B or C.

Having thus described my invention, what I claim is:

1. In a breakwater, a wall consisting of a plurality of vertical posts arranged in line and spaced apart and each provided on the surface thereof which is presented toward the post adjacent thereto with a vertical guideway, and beams having ends slidably engaged with said guideways and stacked vertically therealong, said guideways of said posts engaging said beam ends and retaining same therein against tensional forces exerted on said beams, and spacing members also slidably engaging said guideways and interposed between the ends of each lower beam on the vertical stack of beams and the ends of the beam next thereabove.

2. In a breakwater, a wall consisting of a plurality of vertical posts arranged in line and spaced apart and each provided on the surface thereof which is presented toward the post adjacent thereto with spaced vertical guide members providing a guideway, and beams having ends projecting laterally beyond the sides of the bodies thereof and received within and physically locked to said guideways and stacked therein from a desired lower level to the desired height thereabove, and spacing members also inserted within said guideways and interposed between the ends of at least certain of the beams in the vertical stack of beams and the ends of the beam next thereabove.

3. In the breakwater wall set forth in claim 2, the posts having substantially plane surfaces extending longitudinally thereof, the surfaces on each post facing like surfaces on the posts on opposite sides thereof, and the vertical guideways comprising angle members secured to the said posts and having flanges overhanging the said surfaces with their opposed overhanging edges spaced apart a distance less than the width of the ends of the said beams but sufficient to enable the portions of the beams adjacent to said ends to be slidably received therebetween.

4. In a breakwater, a wall consisting of a plurality of vertical hollow metallic posts spaced apart and each having substantially plane surfaces extending longitudinally thereof, the surfaces on each post facing like surfaces on the posts on opposite sides thereof and each of the said surfaces being provided with vertically extending guideways, beams having ends slidably engaged with the guideways of adjacent posts and said beams being stacked along said guideways from the bottoms thereof to the desired distance thereabove, and spacing members also being formed to slidably engage said guideways and interposed between the ends of each beam and the ends of the beam next thereabove in each stack beginning with the lowermost beam in such stack, and anchoring posts located within the first mentioned posts and extending therebelow a distance suitable for anchoring the wall to the bottom of the body of water in which the said wall is installed.

5. In a breakwater, a wall consisting of a plurality of vertical hollow metallic posts spaced apart and each having substantially plane surfaces extending longitudinally thereof, the surfaces on each post facing like surfaces on the posts on opposite sides thereof and each of the said surfaces being provided with spaced vertically extending guideways, each guideway comprising flanges secured to each of the said posts and spaced from and overhanging the surfaces of said post which are presented toward the corresponding surfaces of the posts on opposite sides thereof, beams each having ends projecting laterally beyond the bodies thereof and which ends are received within the guideways of adjacent posts and said beams being stacked within said guideways from the bottoms thereof to the desired distance thereabove, and spacing members also mounted in said guideways and interposed between the ends of each beam and the ends of the beam next thereabove in each stack, beginning with the lowermost beam in each stack, and anchoring posts located within the first mentioned posts and extending therebelow a distance suitable for anchoring the wall to the bottom of the body of water in which the said wall is installed.

6. A breakwater comprising an outer wall consisting of a plurality of vertical spaced posts, beams interposed between and connecting said posts and arranged in lattice-work formation, an inner wall also comprising posts spaced apart and supporting therebetween means for arresting the movement of water passing through the lattice-work formation, transverse bracing members interposed between and connecting posts of the outer wall with posts of the inner wall, and a deck supported on and secured to said transverse bracing members at the upper portion of said breakwater which is of such height as to have the top portion thereof normally above water.

7. A breakwater comprising an outer wall and an inner wall, each of said walls consisting of a plurality of vertical spaced posts, the posts in each wall being opposed by a post in the other wall, each of said posts being provided with vertically extending guideways and certain guideways on the posts in each wall being presented toward corresponding guideways on adjacent posts in such wall and other guideways on the posts in each wall being presented toward corresponding guideways on the opposed posts in the other wall, beams each having ends slidably engaged with the guideways of adjacent posts of the outer and inner walls and stacked one above another in lattice-work formation therebetween, said beams being physically interlocked by T-shaped end sections with the guideways to retain them in engagement against separating forces set up therebetween.

8. A breakwater comprising an outer wall and an inner wall, each of said walls consisting of a plurality of vertical spaced posts, each of said posts being of metal, the posts in each wall having each substantially plane surfaces extending longitudinally thereof, the surfaces on each post being presented toward substantially plane surfaces on the posts on opposite sides thereof, the said surfaces extending substantially the full lengths of said posts and the posts of each wall also having each a substantially plane surface extending substantially the full length thereof and presented toward like substantially plane surfaces on the posts of the other wall respectively opposed thereto, each of the said surfaces of said posts which is opposed by the corresponding surface of another post being provided with vertically extending guideways, the guideways comprising flanges secured to the posts and spaced from and overhanging the substantially plane surfaces of said posts which are presented toward corresponding surfaces of adjacent posts in the same wall and corresponding surfaces of opposed posts in the outer and inner walls, beams each having ends projecting laterally beyond the bodies thereof and slidably received within guideways of adjacent posts of the outer and inner walls and stacked one above another in lattice-work formation, and beams having like ends received within the guideways of opposed posts in the outer and inner walls and stacked one above the other in lattice-work formation.

9. In the breakwater set forth in claim 7, spacing members slidably engaging the said guideways and interposed between the ends of each beam and the ends of the beam next thereabove in each stack, beginning with the lowermost beam in each stack.

10. In the breakwater set forth in claim 8, spacing plates also slidably received within the guideways and interposed betweent the ends of each beam and the ends of the beam next thereabove in each stack, beginning with the lowermost beam in each stack.

11. In the breakwater set forth in claim 6, the means supported by the posts of the inner wall for arresting the movement of water passing between the beams interposed between the posts of the outer wall consisting of sheet metal piling comprising substantially U-shaped sections each having outwardly divergent side walls extending from the bases thereof and the bases of some of the said U-shaped sections being connected to the posts of the inner wall.

12. A breakwater comprising an outer wall consisting of a plurality of spaced posts, beams interposed between and connecting said posts and arranged in lattice-work formation, an inner wall consisting of sheet metal piling comprising a plurality of substantially U-shaped sections each having a base and outwardly divergent side walls extending from said base, the bases of certain of the U-shaped sections being united to posts which are opposed to posts in the outer wall, and beams interposed between and connecting the posts of the outer wall with the posts in the inner wall.

13. In the breakwater set forth in claim 12, the posts in the outer wall each having vertical guideways extending substantially the unsubmerged length thereof and presented toward similar guideways on adjacent posts and the beams interposed between said posts having ends slidably engaging said guideways and stacked one above another, the lattice-work formation of said beams being effected by spacing members slidably mounted on the guideways and interposed between the ends of each beam and the beam next thereabove in each stack, beginning with the lowermost beam in each stack.

RAYMOND A. BOCCIA.

REFERENCES CITED

The following references are of record in the file of this patent:

UNITED STATES PATENTS

| Number | Name | Date |
|---|---|---|
| 275,952 | Spangler | Apr. 17, 1883 |
| 1,500,119 | Evers | July 8, 1924 |
| 1,681,636 | Farney | Aug. 21, 1928 |
| 1,877,113 | Young | Sept. 13, 1932 |
| 1,948,639 | Youngberg | Feb. 27, 1934 |
| 2,099,249 | Wood | Nov. 16, 1937 |

FOREIGN PATENTS

| Number | Country | Date |
|---|---|---|
| 110,507 | Great Britain | 1917 |